United States Patent [19]
Watzenberger et al.

[11] Patent Number: 5,837,107
[45] Date of Patent: Nov. 17, 1998

[54] PROCESS FOR PRODUCTION OF AQUEOUS SOLUTIONS OF FREE HYDROXYLAMINE

[75] Inventors: Otto Watzenberger, Ludwigshafen; Hans-Michael Schneider, Worms; Bernd Leutner, Frankenthal, all of Germany; Albrecht Wilhelm Friederang, New York, N.Y.

[73] Assignee: BASF Aktiengesellschaft, Ludwigshafen, Germany

[21] Appl. No.: 688,281

[22] Filed: Jul. 29, 1996

[30] Foreign Application Priority Data

Dec. 20, 1995 [DE] Germany .................. 195 47 758.8

[51] Int. Cl.$^6$ .................. B01D 3/38; C01B 21/14
[52] U.S. Cl. .................. 203/78; 203/6; 203/12; 203/79; 203/80; 203/92; 203/93; 203/94; 203/96; 203/97; 203/98; 203/99; 203/DIG. 19; 423/387
[58] Field of Search .................. 203/36–37, 92–94, 203/96–97, 98, 14, 99, 6, 12, DIG. 19, 78–80; 423/386, 387; 564/300

[56] References Cited

U.S. PATENT DOCUMENTS

| | | | |
|---|---|---|---|
| 4,956,168 | 9/1990 | Wagaman | 423/386 |
| 5,266,290 | 11/1993 | Levinthal et al. | 423/387 |
| 5,472,679 | 12/1995 | Levinthal et al. | 203/36 |
| 5,510,097 | 4/1996 | Cawlfield et al. | 203/92 |

*Primary Examiner*—Virginia Manoharan
*Attorney, Agent, or Firm*—Keil & Weinkauf

[57] ABSTRACT

An aqueous solution of free hydroxylamine is prepared by a process in which the solution obtained by treating a hydroxylammonium salt with a base is separated into an aqueous hydroxylamine solution and a salt fraction by treatment with water or steam at $\leq 80°0$ C. The novel process can be carried out in a simple and gentle manner and on a large industrial scale. Owing to the low thermal load, the low concentration of hydroxylamine and the short residence time in the process, the risk of decomposition is minimized.

14 Claims, 1 Drawing Sheet

PROCESS FOR PRODUCTION OF AQUEOUS SOLUTIONS OF FREE HYDROXYLAMINE

The present invention relates to a process for the preparation of aqueous solutions of free hydroxylamine.

Hydroxylamine is an important intermediate for the chemical industry. However, particular caution is required in handling it because it irritates the eyes, the skin and the mucous membranes and can cause allergies. In particular, however, it is thermally unstable, ie. it decomposes slowly to explosively, especially in the presence of metal ions, in a basic medium in relatively high concentration, and at relatively high temperatures.

Hydroxylamine is produced on a large industrial scale as hydroxylammonium salt, usually as hydroxylammonium sulfate, and is also used as such. Frequently, however, it is necessary to use a highly concentrated salt-free aqueous solution of free hydroxylamine. In order to avoid the abovementioned problems and in particular the instability of the hydroxylamine, those skilled in the art have avoided the use of traditional methods of large-scale chemistry for concentrating distillable substances, for example distillation, in the recovery of salt-free hydroxylamine solutions. The distillation of hydroxylamine, even on the laboratory scale, is even said to be a particularly dangerous operation; cf. Roth-Weller: Gefährliche Chemische Reaktionen, Stoffinformationen Hydroxylamin, page 3, 1984, 2, Ecomed-Verlag. The distillation of hydroxylamine on an industrial scale has therefore also never been considered in technical publications. Instead, special methods have been used, although all of them have serious disadvantages.

Attempts were thus made to isolate free hydroxylamine from aqueous salt solutions with the aid of ion exchangers; cf., for example, U.S. Pat. No. 4,147,623, EP-A-1787, EP-A-237052 and Z. Anorg. Ch. 288, 28–35 (1956). However, such a process leads only to dilute solutions with low space-time yields. Moreover, hydroxylamine reacts with many ion exchangers or is decomposed by them.

A further method comprises the electrodialysis of an aqueous hydroxylammonium salt solution in electrolysis cells with semipermeable membranes, as described, for example, in DE-A-33 47 259, JP-A-123771 and JP-A-123772. However, such a process is technically complicated and expensive and has to date not become established in industry.

DE-A-35 28 463 discloses the preparation of free hydroxylamine from hydroxylammonium sulfate by treatment with calcium oxide, strontium oxide or barium oxide and removal of the insoluble alkaline earth metal sulfates. In this method, the removal of the sulfates obtained in finely divided form presents considerable difficulties. In addition, only dilute solutions are obtained and, when calcium oxide or calcium hydroxide is used, free hydroxylamine still contains undesirably large amounts of ions owing to the relatively good solubility of the calcium sulfate. When strontium compounds and barium compounds are used, the relatively high price and especially the toxicity are moreover disadvantages with regard to an industrial production process.

DE-A-12 47 282 describes a process in which alcoholic solutions of free hydroxylamine are obtained by reacting hydroxylammonium sulfate with ammonia in alcohol as a solvent and removing the ammonium sulfate. A similar process is described in EP-A-108 294. However, alcoholic solutions are unsuitable and undesirable for a number of applications. For example, particular precautions must be taken during the handling of such solutions, owing to their flammability. Furthermore, the alcohol used must as a rule be recovered by an expensive procedure, since the discharge of relatively large amounts of alcohol into waste water treatment plants or into outfalls is prohibited.

Finally, DE-A-36 01 803 describes a process for obtaining aqueous solutions of free hydroxylamine, in which hydroxylammonium sulfate is reacted with ammonia in lower alcohols, the precipitated ammonium sulfate is separated off, water is added to the alcoholic solution of free hydroxylamine and the alcohol is distilled off from the solution thus obtained. The abovementioned disadvantages of working with alcohol are applicable to this process too. Moreover, owing to the instability of the hydroxylamine in conjunction with the flammability of the alcohols, particular caution is required in the final distillation stage. Common to all prior art processes is that they are not suitable for being carried out on an industrial scale or give rise to uneconomically high additional safety costs.

For the decomposition of hydroxylamine, a temperature above 65° C. is regarded as critical. In a differential thermal analysis, the onset temperature of a 50% strength by weight aqueous hydroxylamine solution (in a glass crucible) was determined as 70° C. The amount of heat liberated, viz. about 2.2 kJ/g of 50% strength by weight solution, confirms the high thermal potential of the material. Differential thermal analysis is a microthermoanalytical method which is employed for screening to estimate the thermal stability and the thermal potential. The onset temperature is the lowest ambient temperature at which a noticeable exothermic reaction proceeds in the sample at a heating rate of 1 K/min, commencing at 30° C. For safety reasons, the processing temperature should be significantly below the onset temperature.

In the context of the preparation of hydroxylamine nitrate, U.S. Pat. No. 4,956,168 describes the preparation of a slurry of hydroxylamine sulfate in alcohol at a temperature which does not exceed 65° C. This slurry is then treated with ammonia at $\leq 65°$ C. to produce an alcoholic hydroxylamine solution.

U.S. Pat. No. 5,472,679 describes a process for preparing an alcohol-free, aqueous hydroxylamine solution by reacting a hydroxylamine sulfate solution with a suitable base at up to about 60° C. The mixture obtained is then subjected to distillation under reduced pressure at below 65° C. This gives a solid residue (the salt formed in the liberation of the hydroxylamine) and as distillate an aqueous hydroxylamine solution containing 16–23% by weight of hydroxylamine. This process has the disadvantage that it requires working under reduced pressure and the temperature has to be controlled carefully.

In addition, the process requires working with solids. In a continuous process, the solid would accordingly have to be removed continuously. This can present great problems in terms of process technology if the solid is one which tends to cake, eg. in the case of $Na_2SO_4 \cdot xH_2O$.

Furthermore, the "distillation" proceeds to dryness, more correctly described as evaporation, such that the low-boiling water evaporates first. The high-boiling hydroxylamine accumulates. It is known that the decomposition tendency of hydroxylamine increases with the concentration of hydroxylamine, and together with it the losses of hydroxylamine during the process. There is an increasing risk that, because of the high concentration of hydroxylamine, explosive decomposition will occur. It is known that pure hydroxylamine or hydroxylamine >70% by weight decomposes explosively. Thus, appropriate safety requirements must be fulfilled for the process mentioned.

Finally, the remaining solid still contains residues of hydroxylamine (hydroxylamine adsorbed on the surface, hydroxylamine in interstitial spaces in the solid). The solid therefore has to be decontaminated in a separate disposal process.

It has now surprisingly been found that the hydroxylamine solution obtained after partial or complete liberation of hydroxylamine from a hydroxylammonium salt in an aqueous phase can be separated into an aqueous hydroxylamine fraction and a salt fraction by treatment with water or steam at above 65° C., without noticeable decomposition of the hydroxylamine occurring.

The present invention therefore relates to a process for the preparation of an aqueous solution of free hydroxylamine, in which a) a hydroxylammonium salt is treated with a suitable base in water, b) any insoluble components are separated off from the solution obtained, c) the solution obtained in stage (a) or stage (b) is separated into an aqueous hydroxylamine fraction and a salt fraction by treatment with water or steam at $\leq 80°$ C., and d) if desired, the aqueous hydroxylamine solution obtained is concentrated by distillation.

Stage (a) of the novel process is carried out in a conventional manner. Hydroxylammonium salts generally used are the hydroxyl-ammonium salts of mineral acids, for example of sulfuric acid, phosphoric acid or hydrochloric acid, usually in aqueous solution. The hydroxylammonium salt is reacted with a suitable inorganic base, for example ammonia, sodium hydroxide, potassium hydroxide or calcium hydroxide, in aqueous solution. The amount of the base is chosen so that the hydroxylammonium salt is converted completely or at least partially into free hydroxylamine. This may be carried out continuously or batchwise and at from about 0° to 100° C. The resulting aqueous solution contains free hydroxyl-amine and the salt which originates from the base cation and the anion present in the hydroxylammonium salt.

Depending on the type and concentration of the hydroxylammonium salt, the base used for liberating the hydroxylamine and the temperature at which the reaction is carried out, some of the salt formed may be precipitated. If necessary, the solution may also be cooled in order to precipitate a relatively large amount of the salt. If such insoluble components, ie. salt precipitates, are present, they are advantageously separated off in a conventional manner before stage (c). Depending on the process conditions, for example with the use of ammonia as the base or the use of sodium hydroxide as the base and relatively low concentration of the reactants, no precipitate is formed and stage (b) can therefore be dispensed with.

The separation (stage c)) of the solution obtained from stage (a) or stage (b) into an aqueous hydroxylamine solution and a salt fraction is preferably carried out by treatment with water or steam in a stripping column. This is a conventional plate column, eg. bubble tray column or sieve plate column, or is provided with a conventional packing, for example Raschig rings, Pall rings, saddle elements, etc., and preferably has from 5 to 70 theoretical plates. The stabilized solution, to which further stabilizer may, if required, be added, is fed directly to the top of the column (upper part of the packing or uppermost plate).

In the stripping column, the solution is separated in such a way that the salt fraction is taken off at the bottom of the column and an aqueous hydroxylamine solution is taken off at the height of the feed plate or above it, in particular via the top. In order to achieve this, it is preferable to treat the solution by passing water and/or steam countercurrent into the bottom of the column. At a hydroxylamine concentration of from 5 to 45% by weight in the feed solution, the flow rate of water or steam is generally from 1 to 8, in particular from 1 to 5, times the feed rate. The temperature of the water or steam introduced is in general from 80° to 180° C. If required, the bottom of the column is additionally heated.

The pressure in the stripping column is in general from 5 to 300 kPa (from 0.05 to 3 bar), preferably from 50 to 300 kPa (from 0.5 to 3 bar). It is particularly preferable to operate the stripping column at from 50 to 150 kPa (from 0.5 to 1.5 bar).

The temperatures prevailing at the top of the stripping column depend on the pressure at which the column is operated. They are in general 80°–130° C., preferably 90°–120° C. The temperature of the steam passed in can be significantly higher, eg. 150° C. However, it should advantageously not be so high that too much water is also vaporized from the salt solution and the salt begins to precipitate in the bottom of the column.

The aqueous (vaporous or liquid) hydroxylamine fraction taken off via the top of the stripping column usually contains 10–200 g of hydroxylamine/l and may, if desired (stage d), be concentrated in one or more stages which differ from one another in their operating pressure. Advantageously, a conventional packed column containing the abovementioned packings or a suitable plate column or another apparatus suitable for distillation is used. A column having from 4 to 20 theoretical plates is preferred.

In general, the distillation column is operated at from 1 to 200 kPa (from 0.01 to 2 bar), preferably from 5 to 120 kPa (from 0.05 to 1.2 bar), particularly preferably from 30 to 110 kPa (from 0.1 to 1.1 bar). The higher the intended final concentration of hydroxylamine, the gentler (low pressure and low temperature) the distillation must be. The distillation may be carried out continuously or batchwise.

The water taken off via the top of the distillation column can be recirculated as stripping steam to the stripping column or can be conveyed as wastewater to wastewater treatment.

If desired, a droplet precipitator (demister) is additionally installed above the feed plate or in the vapor take-off in such a way that entrainment of the salt by droplets is prevented.

In a particularly preferred embodiment, stripping of the hydroxylamine from the salt solution and partial concentration of the hydroxylamine solution are carried out in only one column, ie. a stripping/distillation column. Water is distilled off via the top and the concentrated hydroxylamine solution is removed about 1 to 3 plates above the feed of the hydroxylamine-containing salt solution from stage (a) or stage (b). The salt solution is fed in roughly in the middle of the column (about 5–30 theoretical plates above the bottom). The hydroxylamine-free salt fraction is taken off at the bottom of the column. The number of theoretical plates of the stripping/distillation column is in general from 10 to 50 and the reflux ratio is adjusted so that it is from 0.5 to 3. Otherwise, the stripping/distillation column is operated as described above.

In a further preferred embodiment, stripping of the hydroxylamine from the salt solution and partial concentration of the hydroxylamine solution are carried out in the above stripping/distillation column with an inserted dividing wall. As described above, water is distilled off via the top and the hydroxylamine-free salt fraction is taken off at the bottom. The hydroxylamine-containing salt solution is fed in, as described, roughly in the middle of the column (about 5–30 theoretical plates above the bottom). At the height of this feed, a dividing wall is mounted in the column over a height of from 1 to 10, preferably from 1 to 5, theoretical plates, so that the column is divided vertically into two separate sections, the feed taking place roughly in the middle of the dividing wall. The solution enriched in hydroxylamine can thus be removed in salt-free form in the region of the dividing wall, on the side opposite the feed point. The dividing wall separates the removal point from the feed point. However, identical concentrations of hydroxylamine are present on both sides of the dividing wall, but salt is present in the solution only on the feed point side. The salt-free solution enriched with hydroxylamine can be removed within the height of the dividing wall, at the height of maximum concentration of the hydroxyl-amine, preferably at the height of the feed or, if required, slightly below. Otherwise, the stripping/distillation column having a dividing wall is operated as described above.

Alternatively to the embodiment with a dividing wall, it is also possible to attach a side column to the stripping/distillation column described above, in such a way that this side column is connected on the gas and liquid side, above and below one or more plates from the feed point, to the stripping/distillation column, and the hydroxylamine-richer solution is removed via this side column and the latter is designed so that passage of salt-containing solution into the removal point of the side column is avoided.

In order to keep the risk of decomposition of the hydroxylamine very low, all solutions which contain free hydroxylamine are stabilized by adding a decomposition stabilizer. Suitable stabilizers are known, for example hydroxyquinaldines, such as 8-hydroxyquinaldine, flavones, such as morin, hydroxyquinolines, such as 8-hydroxyquinoline, hydroxyanthraquinones, such as quinalizarine, which are used, if desired, in combination with polyhydroxy-phenols, such as pyrogallol. Further suitable stabilizers are benzonitrile, benzamidoxime, N-phenylthiourea, N-hydroxythiourea, reductones and/or reductonates, for example 2,3-didehydro-hexano-1,4-lactone, and alkali metal salts of ethylenediamine-tetraacetic acid. The concentration of stabilizers is advantageously from $5 \times 10^{-4}$ to 1, in particular from $5 \times 10^{-3}$ to $5 \times 10^{-2}$, % by weight, based on free hydroxylamine. Stabilizers which have proven particularly useful are 8-hydroxyquinaldine, 8-hydroxyquinoline and also polyethylenimine or polypropylenimine and compounds of the formula $R^1R^2N\text{—}A\text{—}NR^3,R^4$, where A is cycloalkylene or alkylene and $R^1$ to $R^4$ are, independently of one another, $CH_2COOH$ or a benzyl radical which is unsubstituted or substituted on the phenyl ring by OH, $NH_2$ or COOH. Examples of these compounds are trans-1,2-diaminocyclohexane-N,N,N',N'-tetraacetic acid and N,N'-di(2-hydroxybenzyl)ethylene-diamine-N,N'-diacetic acid.

The novel process has the advantage that it can be carried out in a simple and gentle manner. The use of flammable substances and working with solids containing free hydroxylamine can be avoided. The concentration of hydroxylamine is low over the entire process. For example, it is less than 45% by weight in the solution obtained from stage (a) or (b) and less than 30, in general less than 15, % by weight in the stripping column or stripping/distillation column. Owing to the mode of operation of the stripping column or stripping/distillation column, the liquid hold-up is minimal and the residence time in the process is relatively short. Moreover, the mode of operation of the stripping column or stripping/distillation column makes it possible to employ higher pressures, in particular atmospheric pressure.

Higher hydroxylamine concentrations occur only during concentration in the distillation column (stage d). The hydroxylamine concentration of the solution in stage d) can be adjusted as desired, for example in the range from 20 to 70% by weight. In order to reduce the risk of decomposition, further stabilizer may additionally be introduced into the solution to be distilled.

The apparatuses required for the novel process can be produced from nonmetallic materials, such as glass, ceramic and plastics. The decomposition initiated by metal ions is thus ruled out. Surprisingly, it has been found that parts of the apparatuses may also be produced from metallic materials without significantly higher decomposition of the hydroxylamine being observed.

Owing to the simple but at the same time safe process design, only a small capital cost is necessary for carrying out the novel process on an industrial scale. Moreover, the process can be scaled up virtually as desired.

DESCRIPTION OF THE PREFERRED EMBODIMENTS

Figure 1:
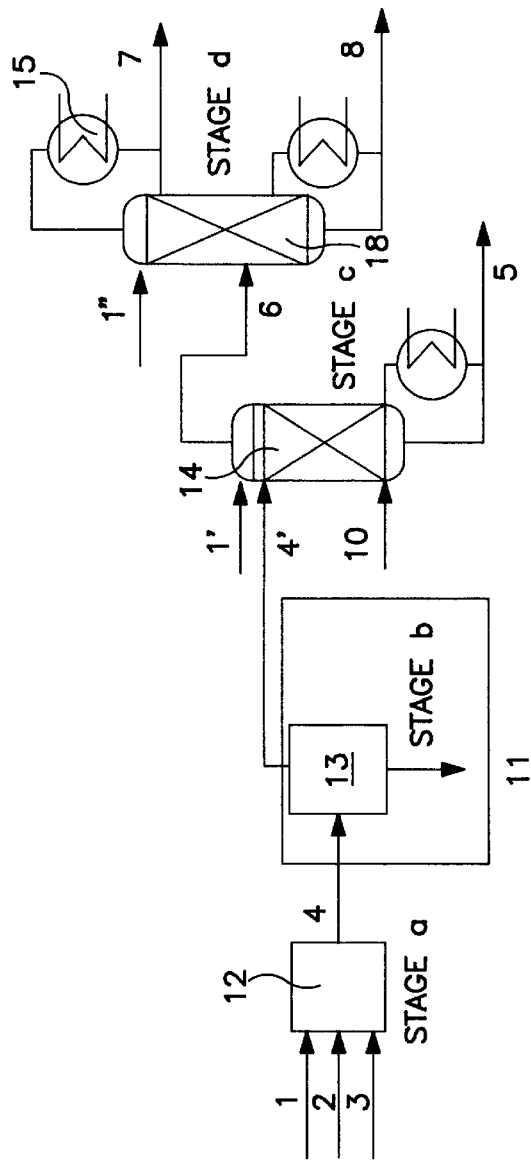
FIG. 1 is a flow chart illustrating one embodiment of the process.
Figure 2:
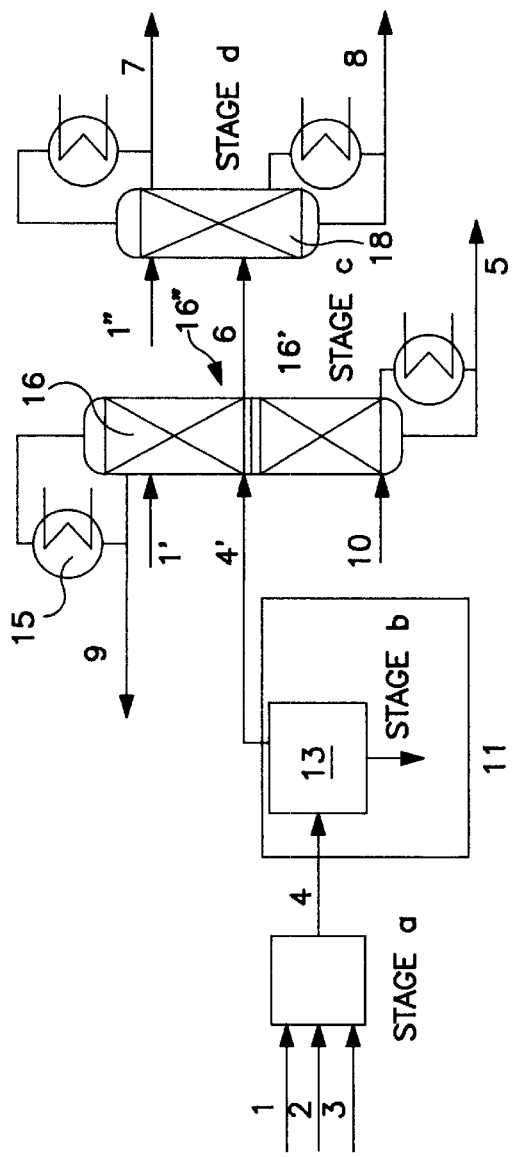
FIG. 2 is a flow chart which illustrates a second embodiment of the invention.

In stage a), a suitable container 12, for example a stirred vessel, a static mixer or a container equipped with a reaction mixing pump, is charged with hydroxylammonium salt or a hydroxylammonium salt solution 3, the base 2 and a stabilizer 1 (cf. FIGS. 1 and 2). Mixing results in an aqueous solution 4 which contains free hydroxylamine and the salt which originates from the base cation and the anion present in the hydroxylammonium salt.

If insoluble components are present in the solution 4, these are separated off in stage (b) with the aid of a filtration apparatus 13, the salt 11 and a solution 4' being obtained (cf. FIGS. 1 and 2).

If required, further stabilizer 1' is then added to the solution 4 or 4'. The separation into an aqueous hydroxylamine fraction and a salt fraction is then carried out according to stage (c).

According to FIG. 1, the separation is carried out in a stripping column 14, the solution 4 or 4' being introduced at the top of the column. For this purpose, steam 10 is passed into the bottom of the column. The separation is effected in such a way that the substantially hydroxylamine-free salt solution 5 is taken off at the bottom of the column, and a salt-free aqueous hydroxylamine fraction 6 (in vapor or liquid form) is taken off via the top (heat exchangers 15 not described in more detail are provided in each of stages (c) and (d)).

According to FIG. 2, the solution 4' is fed into a stripping/distillation column 16. The lower part of the column consists of a stripping section 16' and the upper part of a distillation section 16". The solution 4' is fed in between these two sections, ie. at the top of the stripping section. The separation in the stripping/distillation column 16 is effected in such a way that the substantially hydroxylamine-free salt solution 5 is taken off at the bottom of the column and substantially hydroxylamine-free water 9 via the top. The salt-free hydroxylamine solution 6 is removed via a side take-off.

The hydroxylamine solution 6 obtained from stage (c) can, if desired, be concentrated in a distillation column 18 (stage d). Advantageously, further stabilizer 1" (FIGS. 1 and 2) is added before the distillation. The hydroxylamine solution 6 is fed in at about the height of theoretical plates 1 to 5 of the distillation column 18. In the distillation, substantially hydroxylamine-free water 7 is obtained via the top, and a hydroxylamine solution 8 whose concentration is dependent on the distillation conditions is obtained at the bottom.

In the examples which follow, all hydroxylamine-containing solutions contain 0.01% by weight, based on free hydroxylamine, of stabilizer, eg. 8-hydroxyquinoline, 8-hydroxyquinaldine, trans-1,2-diaminocyclohexane-N,N,N',N'-tetraacetic acid or a branched polyethylenimine having a molecular weight of 800, unless stated otherwise.

EXAMPLE 1

Liberation of hydroxylamine from hydroxylammonium sulfate with ammonia 538.3 g of hydroxylammonium sulfate, 330 g of water and 0.1 g of 8-hydroxyquinaldine as a stabilizer were initially taken in a water-cooled glass 3 l double-jacketed vessel having a stirrer. 446 g of 25% strength ammonia solution were slowly added dropwise at room temperature while stirring. A clear solution containing 16.4% by weight of hydroxylamine was obtained.

EXAMPLE 2

Liberation of hydroxylamine from hydroxylammonium sulfate with sodium hydroxide solution 538.3 g of hydroxylammonium sulfate, 920 g of water and 0.1 g of 8-hydroxyquinaldine as a stabilizer were initially taken in a water-cooled glass 3 l double-jacketed vessel having a stirrer. 1008 g of 25% sodium hydroxide solution were slowly added dropwise at room temperature while stirring. A clear solution containing 8.4% by weight of hydroxylamine was obtained.

EXAMPLE 3

Liberation of hydroxylamine from hydroxylammonium sulfate with sodium hydroxide solution 1500 g/h of a 37% strength by weight hydroxylammonium sulfate solution at 50° C. together with the stoichiometric amount of 50% strength by weight sodium hydroxide solution at room temperature were introduced continuously into a glass stirred vessel having a capacity of 100 ml. The required amount of stabilizer (600 ppm) was dissolved in the sodium hydroxide solution. The reaction volume in the stirred vessel was 70 ml, giving a calculated residence time of 2 minutes. The clear product solution at about 70° C. was taken off continuously via an overflow. The sodium sulfate formed remained in solution. The aqueous solution obtained contained 11% by weight of HA, 23.6% by weight of sodium sulfate and the required amount of stabilizer in the region of 100 ppm. A mass balance was carried out on the streams and no HA decomposition was observed.

EXAMPLE 4

Obtaining an aqueous hydroxylamine (HA) solution from a hydroxylamine (HA)/ammonium sulfate (AS) solution using a stripping column An aqueous solution containing 218 g of HA/l and 680 g of AS/l was added at a rate of 300 ml/h to the uppermost plate of a stripping column. The glass stripping column having a height of 2 m and a diameter of 35 mm was filled with 3 mm glass Raschig rings over a height of 1.8 m. 1000 ml/h of distilled water were fed to the bottom of the column. The column was at 40 kPa. The bottom temperature was 84° C. 1000 ml/h of aqueous, salt-free HA solution containing 39.0 g of HA/h, corresponding to 59.6% of the total HA in the feed, were distilled off via the top of the column. 300 ml/h of ammonium sulfate solution containing 86.0 g/l of HA were taken off from the bottom of the column. This corresponds to 39.4% of the total HA in the feed.

The concentration of HA in the column was not more than 100 g/l. The amount of liquid in the column was 20–225 ml, depending on the loading. The residence time of the liquid in the column was thus only 1.5–10 min. At this low concentration and within the short time, the decomposition rate is low.

Further experiments are listed in the table below.

TABLE 1

Separation of an aqueous HA solution from an aqueous HA/AS solution.

| Feed | HA content | $H_2O$ steam | Pressure | Top temperature | HA via the top | | HA in the bottoms | |
|---|---|---|---|---|---|---|---|---|
| ml/h | g/l | ml/h | kPa | °C. | g/l | (%) | g/l | (%) |
| 318 | 222 | 1156* | 50.0 | 81.0 | 40.5 | 66.9 | 48.6 | 21.2 |
| 170 | 222 | 1060* | 70.0 | 90.5 | 22.8 | 65.6 | 45.2 | 17.2 |
| 370 | 219 | 1475^ | 100.4 | 100.9 | 32.4 | 62.2 | 75.6 | 47.8 |
| 179 | 105.5 | 1530^ | 100.8 | 100.6 | 9.0 | 70.5 | 29.0 | 27.6 |
| 245 | 220.0 | 1530^ | 100.8 | 100.6 | 28.0 | 73.3 | 54.0 | 42.2 |
| 150 | 4 | 990^ | 100.8 | 100.0 | 0.4 | 68.1 | 0.8 | 15.7 |
| 150 | 5.6 | 990^ | 100.8 | 99.9 | 0.6 | 73.0 | 0.4 | 5.6 |
| 119 | 204 | 1063^ | 101.5 | 100.4 | 15.4 | 67.6 | 40.5 | 19.7 |

*The bottom of the column was heated by means of a thermostat.
^The water was fed in as superheated steam for simultaneous heating of the bottom.

EXAMPLE 5

Separation of an aqueous HA solution from an aqueous HA/$Na_2SO_4$ solution using a stripping column The aqueous solution from Example 3, containing 11% by weight of HA and 23.6% by weight of $Na_2SO_4$, was added at a rate of 978 g/h to the uppermost plate of a stripping column. The enamel stripping column having a height of 2 m and a diameter of 50 mm was filled with 5 mm glass Raschig rings. The column was at atmospheric pressure. Steam at 2.5 bar absolute was passed into the bottom of the column. The steam/feed ratio was 2.9:1. 985 g/h of sodium sulfate solution containing 1.7 g/l of HA were taken off from the bottom of the column. This corresponds to 1% of the total HA in the feed. 3593 g/h of aqueous, salt-free solution containing 36.8 g of HA/l, corresponding to 99.2% of the total HA in the feed, were distilled off via the top of the column.

Further experiments are listed in the table below.

TABLE 2

Separation of an aqueous HA solution from an aqueous HA/sodium sulfate solution

| Feed | HA content | Steam/ feed | Pressure | Top temperature | HA via the top | | HA in bottoms | |
| --- | --- | --- | --- | --- | --- | --- | --- | --- |
| g/h | g/l | kg/kg | kPa | °C. | g/l | (%) | g/l | (%) |
| 945 | 135 | 2.6 | 200 | 125.4 | 34.0 | 84.0 | 7.8 | 17 |
| 970 | 136 | 2.7 | 101 | 106.3 | 35.5 | 96.2 | 3.3 | 2.5 |
| 980 | 8.0 | 2.8 | 101 | 107.0 | 2.1 | 95.5 | 0.45 | 5.7 |

EXAMPLE 6

Obtaining an aqueous HA solution from an aqueous HA/sodium sulfate solution using a stripping/ distillation column An aqueous solution containing 221 g of HA/l and 540 g of AS/l was added at a rate of 202 ml/h to the 11th plate of a glass bubble tray column having a diameter of 35 mm, a total height of 1.6 m and 21 plates (lowermost plate=plate 1). 1300 ml/h of steam (about 125° C.) are fed to the bottom of the column. The pressure in the column was 99 kPa. 180 mm/h of substantially HA-free water (0.6 g of HA/l) were taken off at the top of the column at a top temperature of 99.8° C. and a reflux ratio of 1:3 (reflux:feed). The aqueous HA solution (product solution) was taken off at a rate of 1180 ml/h and a concentration of 44 g/l via a side stream from plate 12. 400 ml/h of salt solution were taken off at the bottom of the column.

EXAMPLE 7

Obtaining an aqueous HA solution from an aqueous HA/sodium sulfate solution using a stripping/ distillation column with concentration via a side take-off An aqueous HA solution as described in Example 3, containing 11% by weight of HA and 23.6% by weight of $Na_2SO_4$, was added to the 11th theoretical plate of a glass bubble tray column having a diameter of 50 mm (number of plates corresponding to 30 theoretical plates). Steam at 2.5 bar absolute and about 125° C. was fed to the bottom of the column. The pressure in the column was 101 kPa. Substantially HA-free water (0.05 g of HA/l) were taken off at the top of the column. The aqueous, salt-free HA solution (product solution) was taken off at a concentration of 8.3% by weight via a side stream from plate 12. The salt solution having a residual HA content of 0.2% by weight was taken off at the bottom of the column.

EXAMPLE 8

Concentration of a salt-free aqueous hydroxylamine solution by distillation 1600 g/h of an 8.3% strength by weight aqueous, salt-free, stabilized hydroxylamine solution were fed continuously onto the 8th plate of a glass bubble tray column having a diameter of 50 mm and 30 bubble trays. A small amount of stabilizer dissolved in hydroxylamine solution was additionally metered into the column onto the uppermost plate, plate No. 30. The reflux ratio was set to 0.5. Water was distilled off via the top of the column. The distillate still contained a residual amount of hydroxylamine of 0.07% by weight. About 240 ml/h of a 50% strength by weight hydroxylamine solution were discharged from the bottom of the column via a pump.

We claim:

1. A process for the preparation of a salt-free, aqueous hydroxylamine solution, comprising
    a) mixing a hydroxylammonium salt and an inorganic base in water,
    b) separating off any insoluble components to obtain a hydroxylamine and salt containing aqueous solution, and
    c) treating the aqueous hydroxylamine and salt solution with water or steam to separate the aqueous solution into a salt-free, aqueous hydroxlamine solution and a salt solution,
  wherein the separation (c) is carried out
    c1) at ≦80° C.
    c2) in a stripping column, and
    c3) the water or steam is passed counter current into the bottom of the stripping column, and wherein the salt-free, aqueous hydroxylamine solution is optionally distilled to give a concentrated hydroxylamine solution.

2. The process of claim 1, wherein the salt-free, aqueous hydroxylamine solution is removed at or above the plate of the stripping column where the hydroxylamine and salt solution is fed into the column.

3. The process of claim 1, wherein the stripping column is operated at from 5 to 300 kPa.

4. The process of claim 1, wherein the water or the steam is removed at the top of the stripping column and is completely or partly recirculated to the bottom of the stripping column.

5. The process of claim 1, wherein a decomposition stabilizer is added to the solution containing hydroxylamine.

6. The process of claim 1, wherein the salt-free, aqueous hydroxylamine solution is distilled to give a concentrated hydroxylamine solution.

7. The process of claim 6, wherein a distillation column in the concentration step is operated at from 10 to 150 kPa.

8. The process of claim 6, wherein the separation of the hydroxylamine and salt solution and the concentration of the salt-free, aqueous hydroxylamine solution are carried out in a stripping and distillation column, the concentrated hydroxylamine solution being removed at from 0 to 5 plates above the feed of the hydroxylamine and salt solution, and the water being taken off at the top and the salt solution at the bottom of the column.

9. The process of claim 8, wherein the stripping and distillation column has a vertical dividing wall at the height of the feed point so that the feed side is separated from the point where the concentrated hydroxylamine solution is removed.

10. The process of claim 9, wherein the vertical dividing wall extends over a height of from about 1 to 5 theoretical plates and the feed of the hydroxylamine and salt solution is in the region of half of the height of the dividing wall.

11. The process of claim 8, wherein a side column is attached to the stripping and distillation column and the concentrated hydroxylamine solution is removed at said side column.

12. The process of claim 11, wherein the side column is connected to the stripping and distillation column above one or more plates from the feed point, and is designed so that passage of salt-containing solution into the point of the side column where the concentrated hydroxylamine solution is removed is avoided.

13. The process of claim 8, wherein the water or the steam taken off at the top of the distillation column is completely or partly recirculated to the bottom of the stripping column.

14. The process of claim 8, wherein a decomposition stabilizer is added to the solution containing hydroxylamine.

* * * * *

UNITED STATES PATENT AND TRADEMARK OFFICE
CERTIFICATE OF CORRECTION

PATENT NO.: 5,837,107

DATED: November 17, 1998

INVENTOR(S): WATZENBERGER et al.

It is certified that error appears in the above-identified patent and that said Letters Patent is hereby corrected as shown below:

In the abstract, "$\leq 80°C$" should be --$\geq 80°C$--.

Col. 10, claim 1, line 22, $\leq 80°C$" should be --$\geq 80°C$--.

Signed and Sealed this

Twentieth Day of April, 1999

Attest:

Q. TODD DICKINSON

*Attesting Officer*   Acting Commissioner of Patents and Trademarks